Oct. 12, 1926.　　　　　　　　　　　1,602,930
W. P. PONDELICEK
KINETOSCOPE
Filed March 27, 1922　　　4 Sheets-Sheet 1
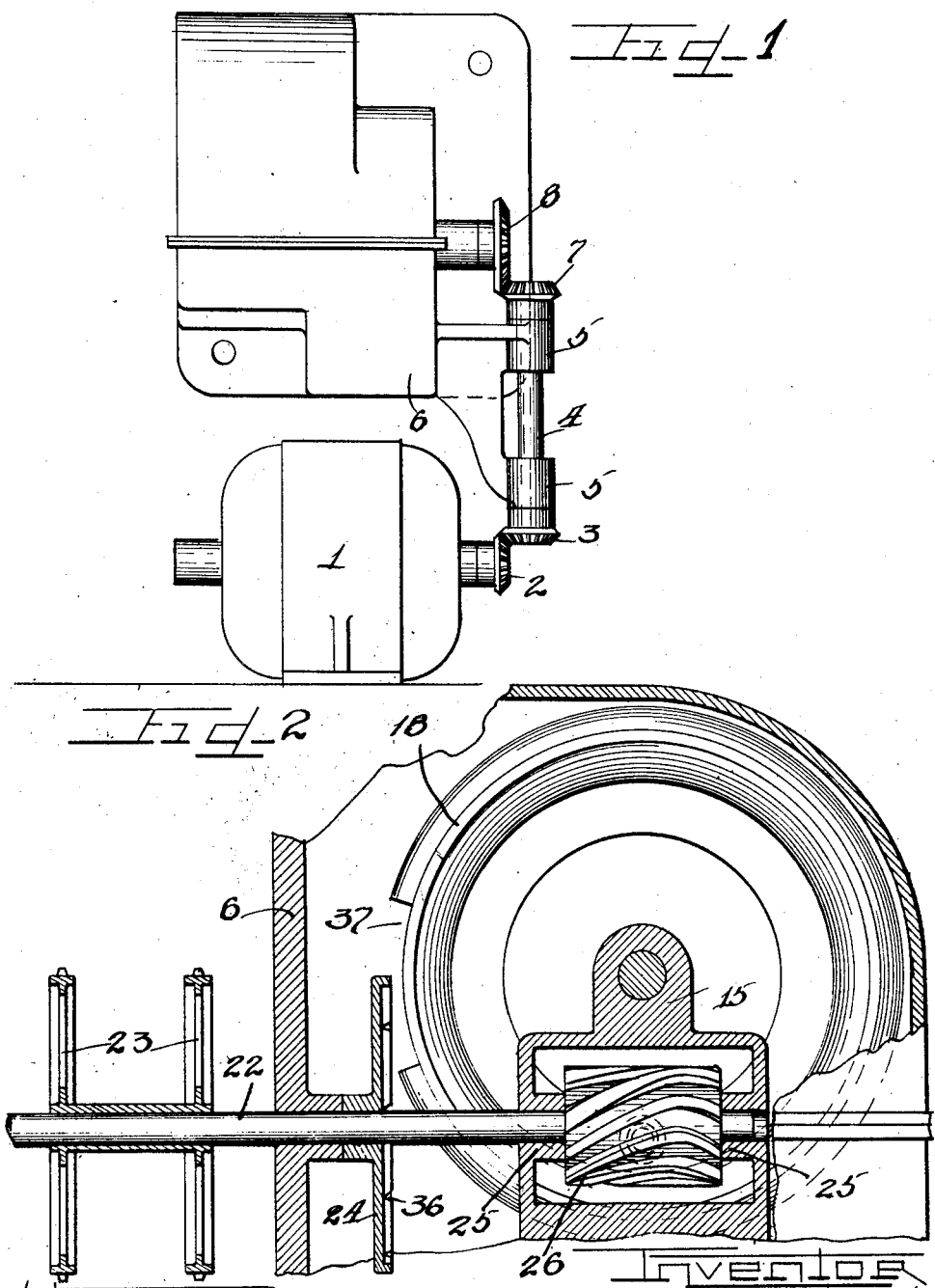

Oct. 12, 1926.
W. P. PONDELICEK
KINETOSCOPE
Filed March 27, 1922 4 Sheets-Sheet 2
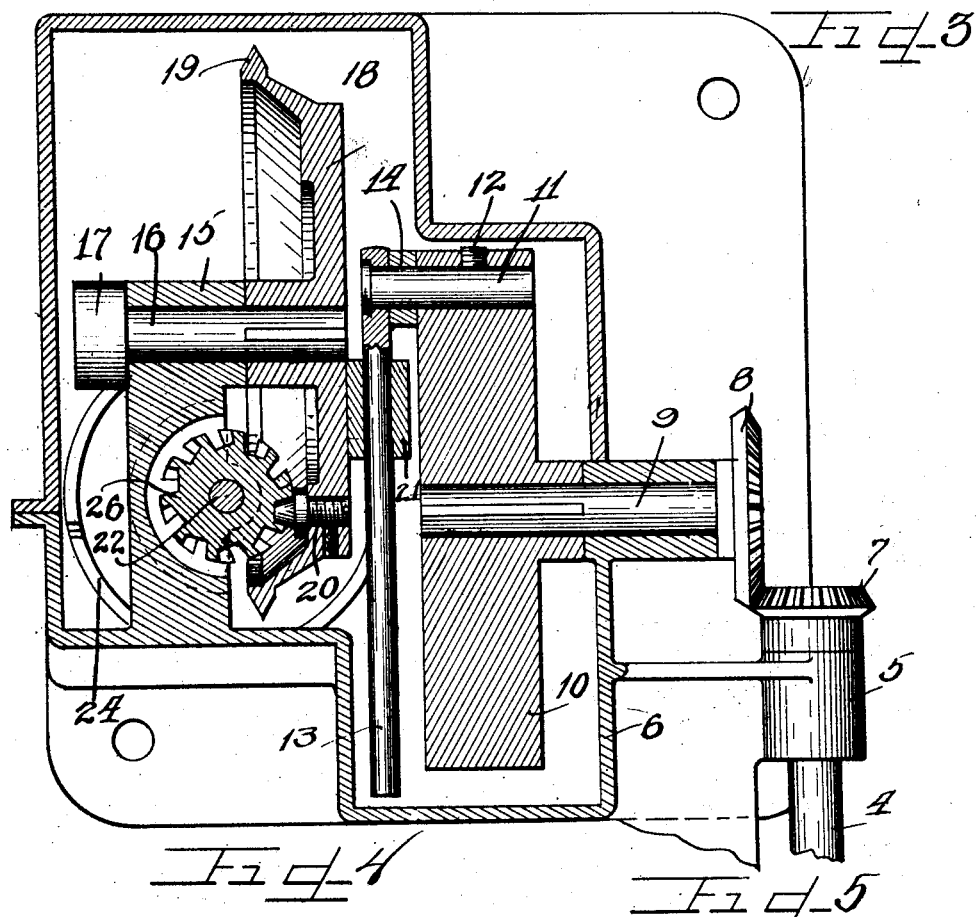
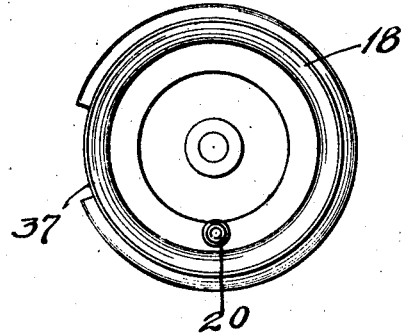
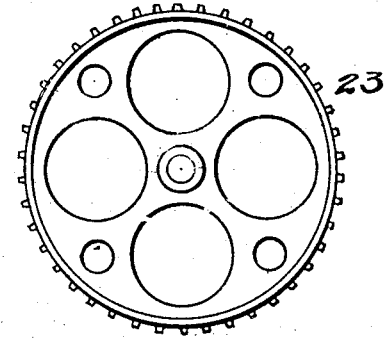

Oct. 12, 1926.  
W. P. PONDELICEK  
KINETOSCOPE  
Filed March 27, 1922
1,602,930
4 Sheets-Sheet 3
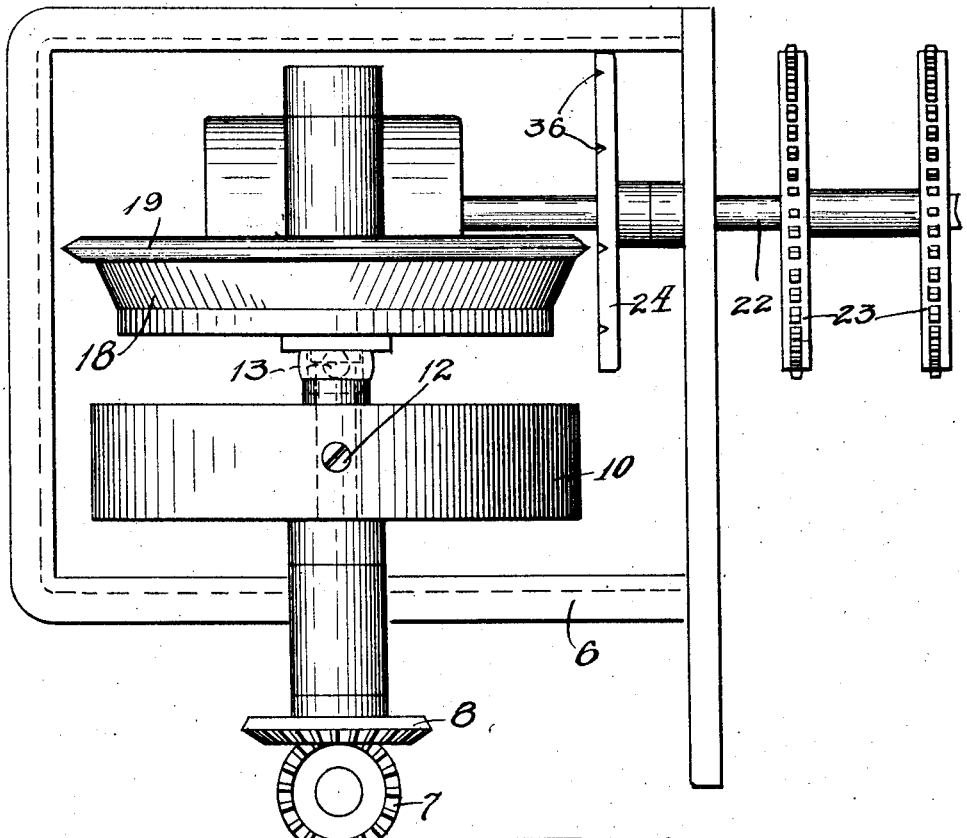
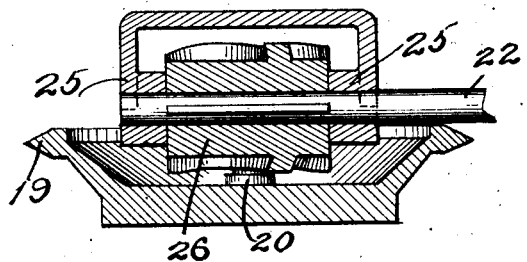

Oct. 12, 1926.
W. P. PONDELICEK
KINETOSCOPE
Filed March 27, 1922
1,602,930
4 Sheets-Sheet 4
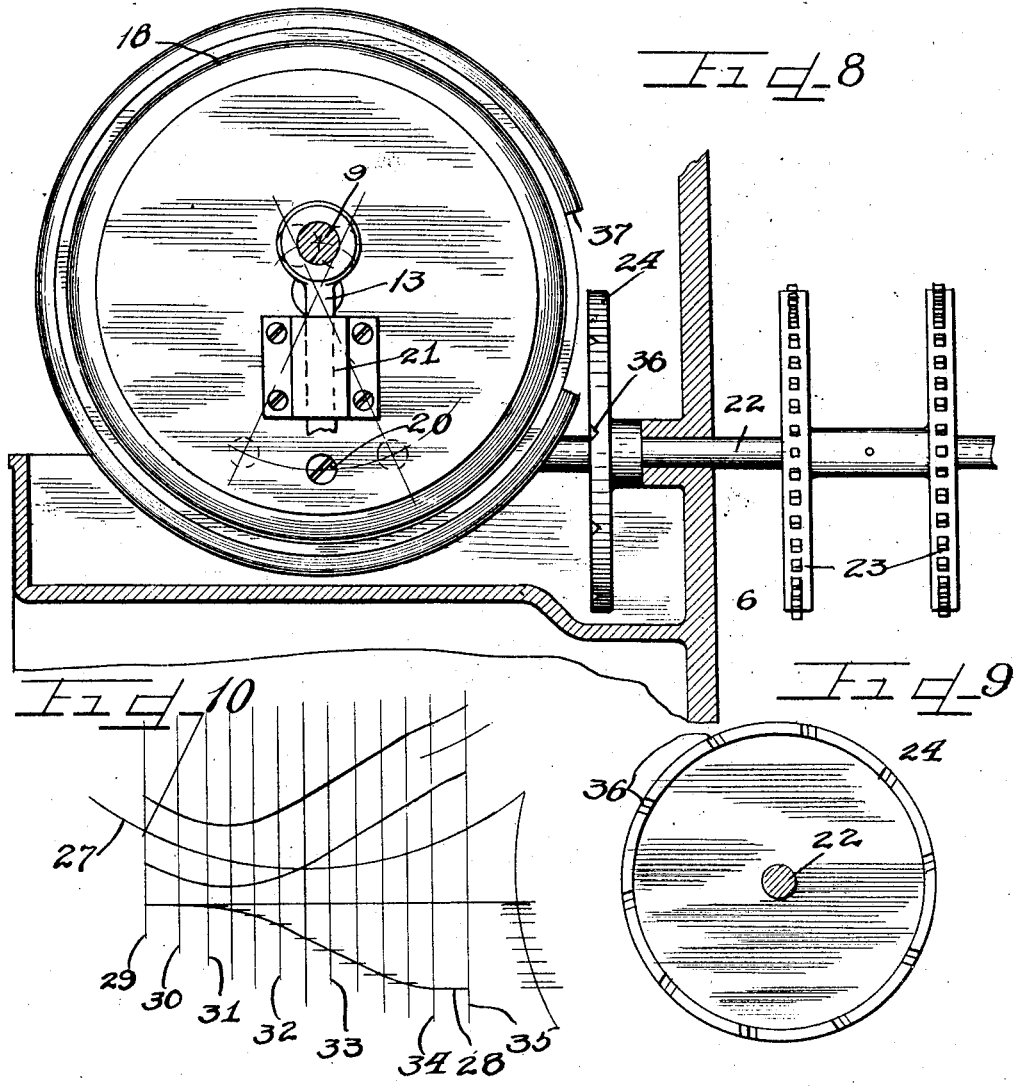

Patented Oct. 12, 1926.

1,602,930

UNITED STATES PATENT OFFICE.

WILLIAM P. PONDELICEK, OF CHICAGO, ILLINOIS, ASSIGNOR OF ONE-THIRD TO MICHAEL E. TOMAN AND ONE-THIRD TO EDWARD TOMAN, BOTH OF CHICAGO, ILLINOIS.

KINETOSCOPE.

Application filed March 27, 1922. Serial No. 547,173.

This invention relates to a kinetoscope, and it is an object of this invention to provide a variable drive that will shift a picture during such a small arc of movement thereof that a shutter is unnecessary.

It is a further object of this invention to provide variable film shifting or advancing means to prevent the tearing of the film under the shifting movements thereof.

It is also an object of this invention to provide film shifting or advancing mechanism that brings the film to a stop before the same is locked while being exhibited.

It is a further object of this invention to provide a kinetoscope of the above characteristics that will avoid flicking of the pictures.

With these and other objects in view, which will become more apparent in the following description and disclosures in the drawings, this invention comprises the novel mechanism and combinations hereinafter described and more particularly pointed out in the appended claims.

In the accompanying drawings, which illustrate a preferred embodiment of this invention, and in which similar reference numerals refer to similar features in the different views:

Figure 1 is an elevation of the kinetoscope connected to an electric motor.

Figure 2 is a view partly in section and partly in elevation illustrating the variable film shifting means upon an enlarged scale.

Figure 3 is a vertical section through the kinetoscope upon an enlarged scale.

Figure 4 is a plan view of the interlocking wheel.

Figure 5 is a plan view of a film sprocket.

Figure 6 is a top plan view of the kinetoscope upon an enlarged scale.

Figure 7 is a fragmentary section through the film shifting mechanism.

Figure 8 is a view partly in section and partly in elevation of the interlocking mechanism and film sprockets upon an enlarged scale.

Figure 9 is a fragmentary plan view of the film locking wheel.

Figure 10 is a diagrammatic view of the development of the variable film shifting worm.

As shown on the drawings. In referring now to the drawings, which illustrate one embodiment of this invention, the numeral 1 (Fig. 1) represents a motor having a gear 2 upon its shaft which meshes with a gear 3 on a vertical shaft 4 journalled in bearing lugs 5 integral with the kinetoscope casing 6. The upper end of the shaft 4 is provided with a beveled gear 7 which meshes with a beveled gear 8 secured upon a driving shaft 9 journalled in a bearing boss formed in the wall of the casing 6.

Within the casing, a disk 10 (Fig. 3) is keyed upon the shaft 9 to rotate therewith. Near the outer periphery of the disk 10, a wrist pin 11 is suitably anchored in an aperture in said disk as by the set screw 12, and a pitman rod 13 is journalled upon the outer end of the pin 11 and spaced from the disk 10 by means of the washer 14.

Within the casing 6, there is a vertical bearing support 15 having a longitudinal journal bearing at its upper end in which a shaft 16 is rotatably mounted against endwise thrust by means of the thrust bearing block 17 secured thereon and bearing against the outer end of said support 15. The inner end of the shaft 16 has keyed thereupon an operating and locking disk 18 having an outer peripheral flange 19 which is beveled to provide a sort of knife edge. The operating means of said disk 18 comprises a stud 20 projecting from the rear side of said disk and having a beveled outer head. The stud may be screw threaded into the wall of said disk and anchored therein by means of a set screw. A hollow bearing block 21 is secured upon the front face of said disk 18 in which the pitman 13 is slidingly mounted. It should be particularly noted that the axis of shaft 16 is offset or eccentric with relation to the axis of the shaft 9, and that the wrist pin 11 is but a short distance above the shaft 16 when in a true vertical plane.

Now, as the disk 10 revolves in one direction, say an anti-clockwise direction, the disk 18 will likewise be caused to rotate in an anti-clockwise direction since the line of the pitman 13 must always pass through the center line of the shaft 16. As the disk 18 revolves from a position in which the pin 11 is near its uppermost position, the pitman 13 will slide in the block 21 which travels further and further away from the pin 11 until substantially an arc of 180° has been traversed. Now as the distance between the pin 11 and block 21 increases, the speed of the disk 18 decreases in relation to the speed of the disk 10. And as both disks travel 180° in the same period of time, a variable speed between the two disks arises which causes the disk 18 to travel very rapidly at first and then more slowly thereafter. The proportion of parts and design is such that as the pin 11 begins to move during its uppermost arc, a very small arc of movement, say 10 degrees, will rotate the disk 18 through a much larger arc which will be sufficient to shift or advance a new picture, and this new picture will be advanced so quickly that it will not be perceptible and a shutter will not be needed. The picture will hence be exhibited while the disk 10 travels substantially through an arc of 350°.

The film advancing mechanism comprises a shaft 22 journalled in a bearing of the casing 6. Beyond the said casing, the shaft 22 has attached thereon the film advancing sprockets 23 of well-known construction, and within the casing a locking disk 24 is secured upon the shaft 22. The aforementioned support 15 is recessed on one side and provided with end bearings 25 in which the shaft 22 is also journalled. In said recess between the bearings 25, a worm or cam wheel 26 is keyed upon the shaft 22 that engages with the stud 20.

The cam wheel 26 is formed with a plurality of irregular longitudinal grooves which in the present instance are contiguous to one another, being separated by narrow ridges in the form of worm teeth. The stud 20 is adapted to be rotated through these grooves for periodically advancing the film. Now, when the stud enters a cam groove, the disk 18 is rotating at about its greatest speed, a speed which will jerk and suddenly pull the film and likely tear the same. This speed is required to effect an imperceptible advancement of the film, and in order to prevent the sudden jerking of the film, the entrance of each cam slot is designed of a pitch of slow approach. A diagrammatic view of the action is shown in Fig. 10, in which the arcuate line 27 represents the arc traversed by the pin 20 as it passes through a cam slot, and the line 28 represents a development of the curve of motion of the cam wheel. In referring to said Fig. 10, the pin 20 is supposed to enter the cam slot from the left hand side. The first pair of ordinates 29 and 30 show the curve 28 as a straight line. Hence there will be no rotation of the cam wheel while the pin 20 traverses the distance between these ordinates. But as the pin 20 advances from the ordinate 30 toward the ordinate 31, the cam wheel will be slowly started on account of the action of the pin 20 against the gradual relative slope of the cam groove between the ordinates 30 and 31. This slope is termed the pitch of slow approach and is designed to gradually start the film to prevent tearing thereof. From the ordinate 31, the pitch of the cam groove increases until the ordinate 32 is reached. The distance between the ordinates 32 and 33 represents the crest of the cam pitch from which the pitch decreases in the same proportion as it ascended until the ordinate 34 is reached. The distance between the ordinates 34 and 35 represents a straight line that indicates no rotative movement of the cam wheel while the pin 20 is passing between these points. This distance between the ordinates 34 and 35 is termed the dwell which holds the shaft 22 stationary while the disk 18 is rotated into interlocking engagement with the disk 24 which is provided with spaced notches 36 one of which is adapted to be rotated into position to be engaged by the knife-edged flange of the disk 18 directly after each advancement of the film.

The knife-edged flange of the disk 18 is cut away at 37 to a circumferential extent substantially equal to the arc through which the disk 18 moves during each rotation of the film advancing mechanism.

*Operation:* Assuming the parts to be in the position in which the pin 11 of disk 10 is about to begin to travel through its uppermost arc, which may be termed the film advancing arc, and the disk 18 has passed out of interlocking engagement with the film locking disk 24 and the stud 20 is about to enter the cam slot or has entered the idle part thereof, rotation of disk 10 will now impart a much greater rate of rotation to disk 18 while the stud 20 is passing through the cam slot of the cam wheel 26. As the stud 20 passes through the cam slot, a variable motion will be imparted to the film supporting shaft 22, as previously explained, and when the stud 20 passes through the dwell of the cam slot, the disk 18 will have rotated through an arc substantially equal to the recessed portion of the knife-edged flange and the shaft 22 will have rotated sufficiently to advance the film and bring a notch 36 of the locking disk 24 in the plane of the knife-edged flange of disk 18, so that the disk 18 may be rotated into interlocking engagement with the locking disk 24 while the shaft 22 is held in a stationary position. When the stud 20 has passed out of engagement with the cam member 24, the film shaft 22 will be held stationary, the disk 18 rotating with its knife edged flange engaging a notch in the locking wheel 24. When the disk 18 has completed its revolution, the knife edged flange will have passed out of engagement with the locking disk, and the stud 20 will again engage the cam member for again advancing the film.

From the foregoing description, it is apparent that the apparatus involving my invention advances the film during a very small arc of travel of the driving member 10, that the film is gradually started so that the same will not tear nor be damaged, that the film shaft is held by the cam worm until locked from rotation during the exhibition of the picture. These results and advantages flow primarily from the novel train of variable driving mechanism that is employed for actuating the film shaft.

I am aware that numerous details of construction may be varied through a wide range without departing from the principles of this invention, and I therefore do not purpose limiting the patent granted otherwise than necessitated by the prior art.

I claim as my invention:

1. In a kinetoscope, a variable speed disk, a film advancing shaft, a variable cam thereon, means on the face of said disk coacting with said cam to rotate the same while said disk is revolving at its highest speed, said cam having a pitch of slow approach at the start of its rotation and a dwell at the end thereof, and a second disk having circumferential notches therein and mounted on said film advancing shaft, said notches coacting with the edge of said first disk to lock said shaft against rotation when said means is out of engagement with said cam.

2. In a kinetoscope a variable speed disk, a film advancing shaft, a cam wheel secured to said shaft having more than four longitudinal grooves therein of variable pitch, means on the face of said disk coacting with said grooves to rotate said cam and advance the film by one picture while said disk is revolving at its highest speed, said grooves having each a pitch of slow approach at the start and a dwell at the end thereof, and a second disk having circumferential notches therein and mounted on said film advancing shaft, said notches coacting with the edge of said first disk to lock said shaft against rotation when said means is out of engagement with said cam.

In testimony whereof I have hereunto subscribed my name.

WILLIAM P. PONDELICEK.